United States Patent
Song et al.

(10) Patent No.: US 11,569,548 B2
(45) Date of Patent: Jan. 31, 2023

(54) SEPARATOR AND LITHIUM-SULFUR BATTERY COMPRISING THE SAME

(71) Applicant: LG CHEM, LTD., Seoul (KR)

(72) Inventors: Jieun Song, Daejeon (KR); Doo Kyung Yang, Daejeon (KR); Seungbo Yang, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 224 days.

(21) Appl. No.: 16/753,231

(22) PCT Filed: Oct. 11, 2018

(86) PCT No.: PCT/KR2018/011949
§ 371 (c)(1),
(2) Date: Apr. 2, 2020

(87) PCT Pub. No.: WO2019/093661
PCT Pub. Date: May 16, 2019

(65) Prior Publication Data
US 2021/0151833 A1 May 20, 2021

(30) Foreign Application Priority Data
Nov. 8, 2017 (KR) .................. 10-2017-0147760

(51) Int. Cl.
| | |
|---|---|
| *H01M 50/449* | (2021.01) |
| *H01M 50/414* | (2021.01) |
| *H01M 50/446* | (2021.01) |
| *H01M 50/431* | (2021.01) |
| *H01M 10/052* | (2010.01) |
| *H01M 10/0565* | (2010.01) |

(52) U.S. Cl.
CPC ....... *H01M 50/449* (2021.01); *H01M 10/052* (2013.01); *H01M 10/0565* (2013.01); *H01M 50/414* (2021.01); *H01M 50/431* (2021.01); *H01M 50/446* (2021.01); *H01M 2300/0082* (2013.01)

(58) Field of Classification Search
None
See application file for complete search history.

(56) References Cited

U.S. PATENT DOCUMENTS

| | | | |
|---|---|---|---|
| 2015/0104690 A1 | 4/2015 | Xiao et al. | |
| 2015/0318532 A1 | 11/2015 | Manthiram et al. | |
| 2016/0233475 A1 | 8/2016 | Son et al. | |
| 2017/0141397 A1* | 5/2017 | Lecuyer | H01M 10/052 |
| 2018/0198156 A1 | 7/2018 | Lee et al. | |

FOREIGN PATENT DOCUMENTS

| | | |
|---|---|---|
| CN | 103872282 A | 6/2014 |
| CN | 104577060 A | 4/2015 |
| CN | 105637677 A | 6/2016 |
| KR | 10-2013-0040022 A | 4/2013 |
| KR | 10-2010-0062617 A | 6/2016 |
| KR | 10-2016-0137486 A | 11/2016 |
| KR | 10-2017-0003604 A | 1/2017 |
| KR | 10-2017-0090294 A | 8/2017 |
| WO | WO 2015/088451 A1 | 2/2014 |

OTHER PUBLICATIONS

Wang, G., Lai, Y., Zhang, Z., Li, J., Zhang, Z.—Enhanced rate capability and cycle stability of lithium-sulfur batteries with a bifunctional MCNT@PEG-modified separator, J. Mater. Chem. A, 2015, 3, pp. 7139-7144 (Year: 2015).*
Bauer, I., Thieme, S., Bruckner, J., Althues, H., Kaskel, S.—Reduced polysulfide shuttle in lithium-sulfur batteries using Nafion-based separators, Journal of Power Surces, 251 (2014), pp. 417-432 (Year: 2014).*
Huang et al., "Permselective Graphene Oxide Membrane for Highly Stable and Anti-Self-Discharge Lithium-Sulfur Batteries", ACS Nano 2015, vol. 9, No. 3, pp. 3002-3011.
International Search Report (PCT/ISA/210) issued in PCT/KR2018/011949, dated Jan. 23, 2019.
Liu et al., "Flexible Carbon Nanotube Modified Separator for High-Performance Lithium-Sulfur Batteries", Nanomaterials, 2017, vol. 7, No. 8, Article No. 196, pp. 1-10.
Extended European Search Report for European Application No. 18876472.4, dated Oct. 26, 2020.

* cited by examiner

*Primary Examiner* — Anca Eoff
(74) *Attorney, Agent, or Firm* — Birch, Stewart, Kolasch & Birch, LLP

(57) ABSTRACT

A separator including a porous base and a coating layer on at least one surface of the porous base, the coating layer including (a) a carbon nanotube including an oxygen functional group and (b) a lithium ion conducting polymer, and a lithium-sulfur battery including the same. Such a separator may be capable of resolving problems caused by lithium polysulfide occurring in a lithium-sulfur battery.

14 Claims, 5 Drawing Sheets

[Figure 1]
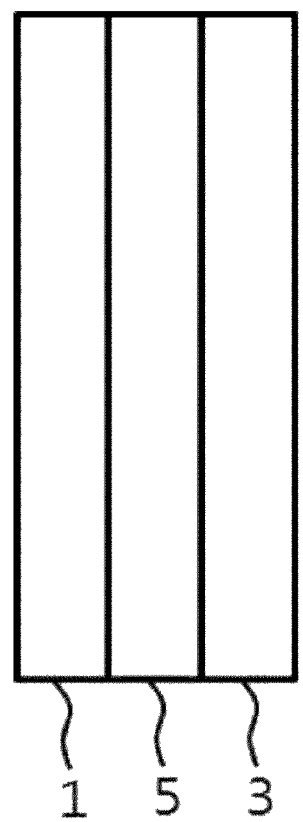

[Figure 2]
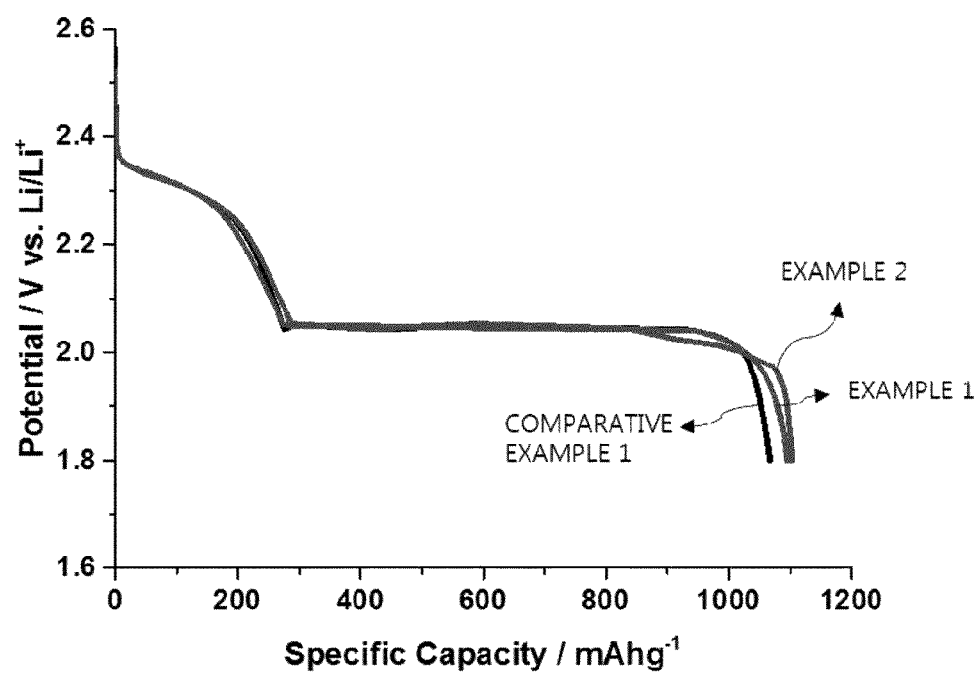

【Figure 3】
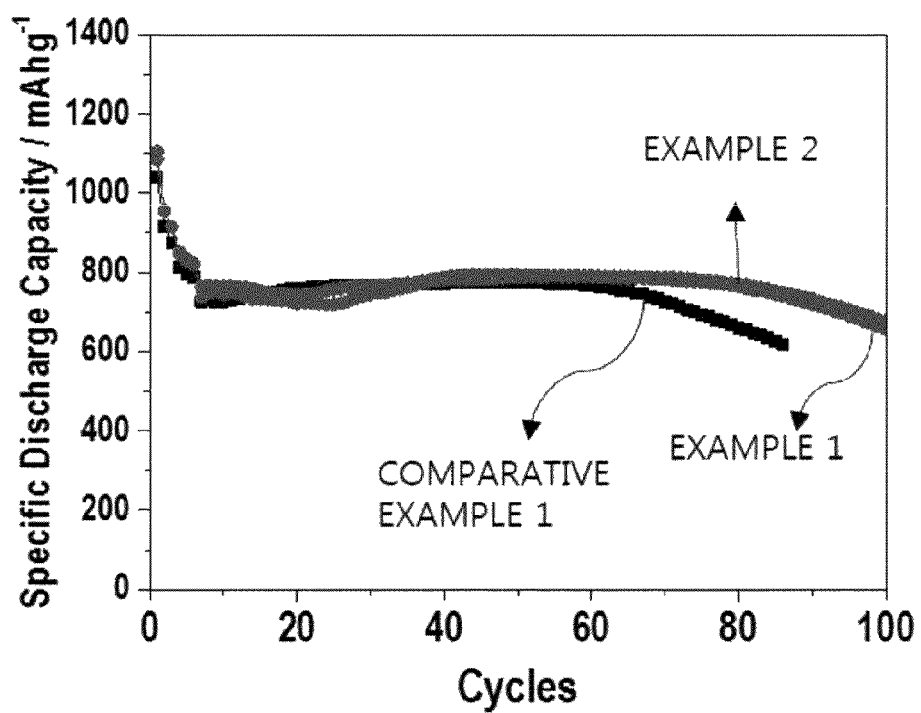

【Figure 4】
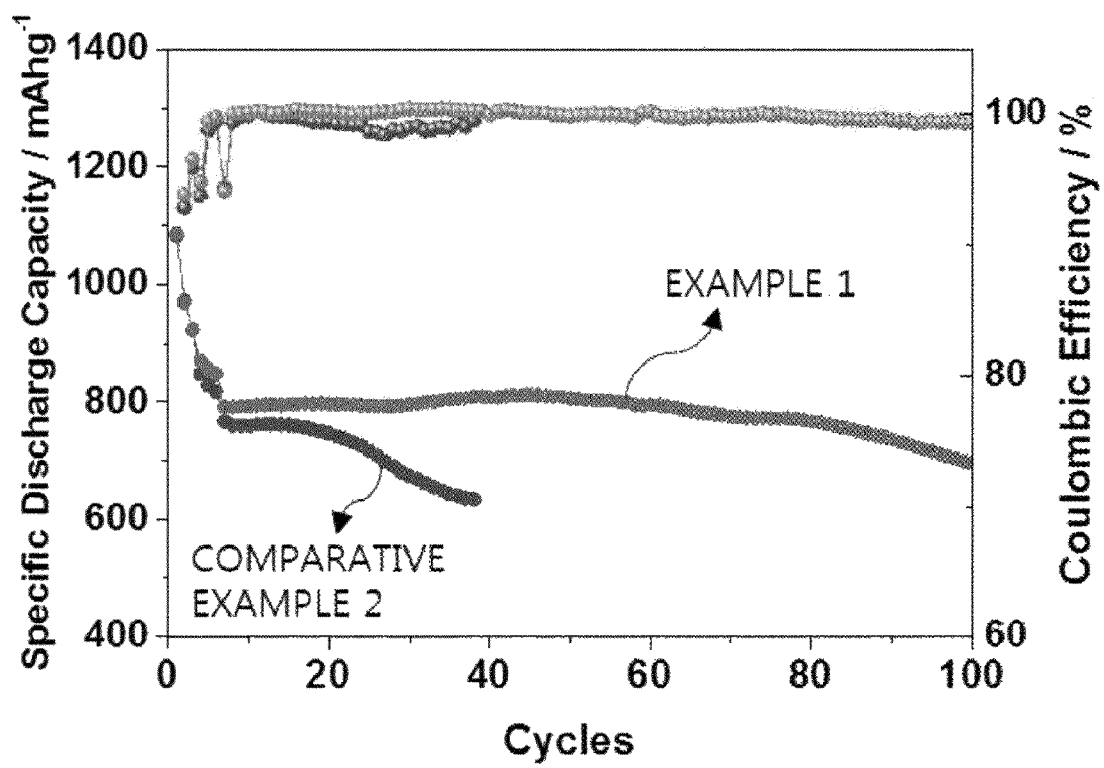

[Figure 5]
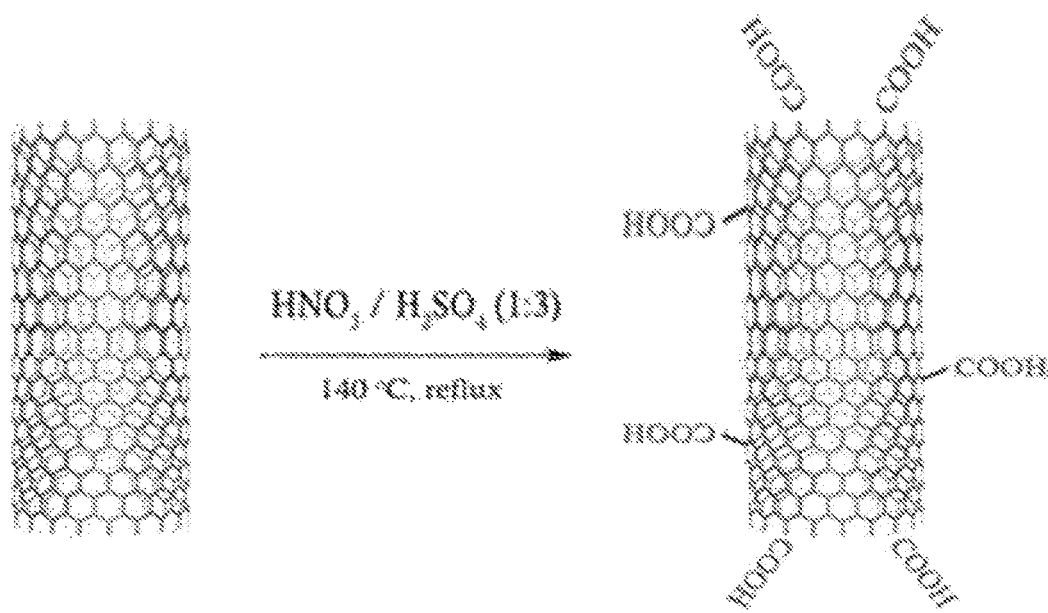

SEPARATOR AND LITHIUM-SULFUR BATTERY COMPRISING THE SAME

CROSS-REFERENCE TO RELATED APPLICATIONS

This application is a National Stage entry under 35 U.S.C. § 371 of the International Application No. PCT/KR2018/011949 filed on Oct. 11, 2018, which claims priority to the Application No. 10-2017-0147760 filed in the Republic of Korea on Nov. 8, 2017, the entire contents of which are incorporated herein by reference.

TECHNICAL FIELD

The present invention relates to a separator capable of resolving problems caused by lithium polysulfide, and a lithium-sulfur battery comprising the same.

BACKGROUND ART

As electronic goods, electronic devices, communication devices and the like have rapidly become smaller and lighter recently, and necessity of electric vehicles has highly emerged regarding environmental problems, demands for improving performance of secondary batteries used as a power source of these goods have greatly increased. Among these, lithium secondary batteries have received considerable attention as a high performance battery due to their high energy density and high standard electrode potential.

Particularly, lithium-sulfur (Li—S) batteries are a secondary battery using a sulfur series material having sulfur-sulfur (S—S) bonds as a positive electrode active material, and using lithium metal as a negative electrode active material. Sulfur, a main material of a positive electrode active material, has advantages of being very abundant in resources, having no toxicity and having a low atomic weight. In addition, a lithium-sulfur battery has theoretical discharge capacity of 1675 mAh/g-sulfur and theoretical energy density of 2,600 Wh/kg, which is very high compared to theoretical energy density of other battery systems (Ni-MH battery: 450 Wh/kg, Li—FeS battery: 480 Wh/kg, Li—MnO$_2$ battery: 1,000 Wh/kg, Na—S battery: 800 Wh/kg) currently studied, and therefore, is a most promising battery among batteries that have been developed so far.

During a discharge reaction of a lithium-sulfur battery, an oxidation reaction of lithium occurs in a negative electrode (anode), and a reduction reaction of sulfur occurs in a positive electrode (cathode). The lithium-sulfur battery produces lithium polysulfide (Li$_2$S$_x$, x=2 to 8) during discharge, and this is dissolved in an electrolyte and diffused to a negative electrode causing various side reactions, and also reduces capacity of sulfur participating in an electrochemical reaction. In addition, the lithium polysulfide causes a shuttle reaction during a charging process significantly reducing charge and discharge efficiency.

In order to resolve such problems, methods of adding an additive having a sulfur-adsorbing property have been proposed, however, a deterioration problem has occurred newly producing additional battery side reactions. In view of the above, methods of adding a metal chalcogenide, alumina or the like or coating the surface with oxycarbonate and the like have been proposed in order to delay an outflow of a positive electrode active material, that is, sulfur, however, such methods either have the sulfur lost during a treatment process or are complicated, and also limit the amount of sulfur, an active material, to introduce (that is, loading amount).

Accordingly, for commercialization of a lithium-sulfur battery, the problems of lithium polysulfide are a priority issue.

PRIOR ART DOCUMENTS (Patent Document 1) Korean Patent Publication No. 2017-0003604 (2017.01.09), "Bifunctional separator for lithium-sulfur battery"

(Patent Document 2) Korean Patent Publication No. 2016-0137486 (2016.11.30), "Separator provided with porous coating layer and electrochemical device provided with the same"

DISCLOSURE

Technical Problem

In order to resolve lithium polysulfide problems occurring on a positive electrode side of a lithium-sulfur battery, the inventors of the present invention have identified that, when applying a new structure using a carbon nanotube comprising an oxygen functional group and a lithium ion conducting polymer in a separator adjoining thereto, the problems are resolved and battery performance of a lithium-sulfur battery may be enhanced, and have completed the present invention.

Accordingly, an aspect of the present invention provides a separator for a lithium-sulfur battery capable of resolving problems caused by lithium polysulfide.

Another aspect of the present invention provides a lithium-sulfur battery having enhanced battery performance by being provided with the separator.

Technical Solution

According to an aspect of present invention, there is provided a separator for a lithium-sulfur battery comprising a porous base; and a coating layer formed on at least one surface thereof, wherein the coating layer comprises a carbon nanotube comprising an oxygen functional group and a lithium ion conducting polymer.

Herein, the oxygen functional group is any one or more selected from the group consisting of a carboxyl group, a hydroxyl group, an ether group, an ester group, an aldehyde group, a carbonyl group and an amide group.

Herein, in the coating layer, the carbon nanotube comprising an oxygen functional group and the lithium ion conducting polymer are mixed in a weight ratio of 1:5 to 1:20.

According to another aspect of present invention, there is provided a lithium-sulfur battery comprising the separator for a lithium-sulfur battery.

Advantageous Effects

A separator according to the present invention comprises both a carbon nanotube comprising an oxygen functional group and a lithium ion conducting polymer, and thereby resolves problems caused by lithium polysulfide occurring in a positive electrode of a lithium-sulfur battery.

In the lithium-sulfur battery provided with the separator, a decrease in sulfur capacity does not occur allowing high capacity battery, and battery stability is enhanced since sulfur can be stably used in high loading and there are no problems such as battery short circuit and heat generation. Moreover, such a lithium-sulfur battery has advantages of having high battery charge and discharge efficiency and improving lifetime properties.

DESCRIPTION OF DRAWINGS

FIG. 1 is a sectional view illustrating a lithium-sulfur battery according to one embodiment of the present invention.

FIG. 2 is a graph showing initial charge and discharge capacity of lithium-sulfur batteries manufactured in Examples 1 and 2, and Comparative Example 1.

FIG. 3 is a graph showing lifetime properties of lithium-sulfur batteries manufactured in Examples 1 and 2, and Comparative Example 1.

FIG. 4 is a graph showing lifetime properties of lithium-sulfur batteries manufactured in Example 1 and Comparative Example 2.

FIG. 5 illustrates the carbon nanotube including an oxygen function group prepared using a method according to one embodiment of the present invention.

BEST MODE

The present invention provides a lithium-sulfur battery and a separator used therein.

FIG. 1 is a sectional view illustrating a lithium-sulfur battery (10), which has a structure comprising lithium metal as a negative electrode (1) and sulfur as a positive electrode (3), and a separator (5) disposed therebetween. Herein, an electrolyte (not shown) is present in a form in which the separator (5) is impregnated between the negative electrode (1) and the positive electrode (3).

When charging and discharging a lithium-sulfur battery (10), lithium polysulfide is produced in a positive electrode causing a decrease in the charge capacity and a decrease in the energy of the battery (10), and lithium dendrite is generated in a negative electrode causing a stability problem such as short circuit, heat generation, ignition and exposition of the battery together with a decrease in the battery lifetime. In order to resolve such problems, methods of adding a new composition or forming an additional coating layer on the electrodes have been proposed, however, an effect of enhancing battery performance to a target level has not been able to be secured.

In view of the above, the present invention proposes a separator (5) having a new structure in order to resolve such problems.

Specifically, the separator (5) according to the present invention includes a porous base and a coating layer formed on one surface or both surfaces thereof. When forming the coating layer on one surface of the porous base, the coating layer may be placed on any of the negative electrode (1) side or the positive electrode (3) side, and in the present invention, the coating layer is preferably formed so as to face the positive electrode (3).

The porous base forming the separator (5) enables lithium ion transport between the negative electrode (1) and the positive electrode (3) while separating or insulating the negative electrode (1) and the positive electrode (3) from each other. Such a separator (5) may be formed with materials that are porous, nonconductive or insulating. The separator (5) may be an independent member such as a film.

Specifically, as the porous base, a porous polymer film may be used either alone, or as a laminate thereof, or common porous non-woven fabrics such as non-woven fabrics made of high melting point glass fiber or polyethylene terephthalate fiber may be used, however, the porous base is not limited thereto.

A material of the porous base is not limited in the present invention, and materials commonly used in the art may be used. Typically, the porous base may be formed with any one selected from the group consisting of polyolefin such as polyethylene or polypropylene, polyester such as polyethylene terephthalate or polybutylene terephthalate, polyamide such as aramid, polyacetal, polycarbonate, polyimide, polyetherketone, polyethersulfone, polyphenylene oxide, polyphenylene sulfide, polyethylene naphthalene, polytetrafluoroethylene, polyvinylidene fluoride, polyvinyl chloride, polyacrylonitrile, cellulose, nylon, polyparaphenylene benzobisoxazole and polyarylate, or a mixture of two or more thereof.

The porous base may have a thickness of 3 μm to 100 μm, or 3 μm to 30 μm. The range of the porous base is not limited particularly to the range described above, however, when the thickness is excessively smaller than the above-described lower limit, mechanical properties decline and the separator (5) may be readily damaged during battery use. Meanwhile, sizes of pores present in the porous base and porosity are not particularly limited as well, but may be from 0.01 μm to 10 μm and 25% to 85%, respectively.

The coating layer formed on at least one surface of the porous base performs a role of resolving problems caused by lithium polysulfide, and for this, comprises both a carbon nanotube having a functional group introduced thereto and a lithium ion conducting polymer.

A carbon nanotube (CNT) is a carbon allotrope having a cylinder-shaped nanostructure, and is useful in various fields such as nanotechnology, electrical engineering, optics and material engineering due to its many unique properties.

Particularly, deterioration of a battery caused by repetitive charge and discharge may be very effectively reduced by using a carbon nanotube in a secondary battery, and battery performance may be enhanced by using a metallic carbon nanotube having very high electron transporting power in a negative electrode.

In the present invention, the inventors have discovered that, when using a carbon nanotube in a lithium-sulfur battery, battery performance may be enhanced by 'a carbon nanotube comprising an oxygen functional group' obtained by acid treating the carbon nanotube adsorbing lithium polysulfide generated during a charge and discharge process of the lithium-sulfur battery and thereby preventing a shuttling phenomenon, and have completed the present invention.

The carbon nanotube according to the present invention may be present in a form of the oxygen functional group being introduced at the end group of the carbon nanotube. In other words, all the end groups of the carbon nanotube may be substituted with the oxygen functional group, or some of the end groups of the carbon nanotube may be substituted by the oxygen functional group.

Types of the oxygen functional group introduced at the end group of the carbon nanotube are not particularly limited, and, in the present invention, examples thereof may comprise one or more selected from the group consisting of a carboxyl group, a hydroxyl group, an ether group, an ester group, an aldehyde group, a carbonyl group and an amide group, and may preferably comprise a carboxyl group or a hydroxyl group, however, the oxygen functional group is not limited thereto.

Types of the carbon nanotube are not particularly limited in the present invention, and examples thereof may comprise a multi-walled carbon nanotube or a single-walled carbon nanotube.

A length of the carbon nanotube is not particularly limited in the present invention, but may be preferably from 5 μm to 200 μm. When the carbon nanotube length is less than 5 μm, it is difficult to form a porous structure inside the coating layer, and a lithium polysulfide adsorption property may be significantly reduced and capacity may decrease since material transportation is interrupted. When the carbon nanotube length is greater than 200 μm, sizes of formed secondary particles are large causing a concern of short circuit occurrences between a negative electrode and a positive electrode of a lithium-sulfur battery.

For preparing the carbon nanotube comprising an oxygen functional group, a carbon nanotube is treated with an acid in a reactor, and the result may be reacted while stirring at a temperature of 25° C. to 60° C. Types of the acid are not particularly limited as well, and any acid may be used as long as it is capable of introducing an oxygen functional group on the carbon nanotube surface. Examples thereof may comprise sulfuric acid, nitric acid or mixtures thereof, and oxidizers such as potassium permanganate may also be used.

The acid content is not particularly limited, but may be preferably from 50 parts by weight to 1,000 parts by weight with respect to 1 parts by weight of the carbon nanotube. When the acid content is less than 50 parts by weight, a cutting reaction obtained by a chemical oxidation of the carbon nanotube may not occur favorably, and when the acid content is greater than 1,000 parts by weight, it may be difficult to collect the carbon nanotube cut by a chemical oxidation due to the excessive amount of acid mixture.

Next, deionized water may be added to the carbon nanotube and acid reaction mixture obtained through the chemical oxidation reaction for dilution, and the result may be centrifuged. The condition of the centrifugation is not particularly limited, and for example, the centrifugation may be performed for 10 minutes to 30 minutes at a centrifugation rate of 4,000 rpm to 10,000 rpm.

Subsequently, the centrifuged result may be filtered, and then washed using deionized water. In addition, the washed result may be dried at a temperature of 90° C. to 100° C. to obtain a carbon nanotube comprising an oxygen functional group.

The carbon nanotube comprising an oxygen functional group prepared using the method according to one embodiment of the present invention may be as illustrated in the reaction shown in FIG. 5.

The present invention is capable of enhancing Coulomb efficiency circulation stability of a battery by using a carbon nanotube comprising an oxygen function group in the coating layer of the separator (5) to adsorb lithium polysulfide generated by a reaction between sulfur of the positive electrode (3) and lithium of the negative electrode (1), and thereby resolving a problem of side reactions occurring on the negative electrode (1) surface due to a shuttle effect thereof such as reacting with lithium metal to form a high-resistance layer of $Li_2S$ at the interface, or precipitating at the electrode interface.

Moreover, by binding the lithium polysulfide to the coating layer of the separator (5) and thereby suppressing diffusion and migration of the lithium polysulfide to the negative electrode (1), an existing problem of sulfur capacity loss caused by lithium polysulfide is resolved, and a high capacity battery is obtained, and safety is obtained even when high loading sulfur. In addition thereto, by binding the lithium polysulfide, escaping from an electrochemical reaction region of the positive electrode (3) is minimized.

In addition, the carbon nanotube comprising an oxygen functional group according to one embodiment of the present invention may comprise an oxygen atom in 0.5% to 30%, preferably in 1% to 20% and most preferably in 2% to 15% with respect to the whole carbon nanotube.

When the oxygen atom composition is less than the above-mentioned range, adsorption capability of lithium polysulfide may decrease, and when the oxygen atom composition is greater than the above-mentioned range, an effect of enhancing battery performance in a high loading electrode is insignificant when using this in the separator of a lithium-sulfur battery, and therefore, the oxygen atom composition is properly controlled within the above-mentioned range.

Even when problems caused by lithium polysulfide is resolved, a carbon nanotube comprising an oxygen functional group having such an effect has had a new problem of slowing a lithium ion transfer rate when actually applied to the separator (5).

In other words, when using a liquid electrolyte, the separator (5) needs to be present in a sufficiently impregnated (wetted) state in the liquid electrolyte in order for lithium ions to pass through the separator (5) and be transported to the positive electrode (3) and the negative electrode (1).

In view of the above, the present invention uses the carbon nanotube comprising an oxygen functional group mixing with a lithium ion conducting polymer in order to resolve problems caused when using the carbon nanotube comprising an oxygen functional group alone.

In order to be mixed with the carbon nanotube, materials capable of readily securing a lithium ion diffusion path and increasing lithium ion conductivity without affecting lithium polysulfide adsorption obtained by the carbon nanotube need to be selected.

The lithium ion conducting polymer according to one embodiment of the present invention may comprise one or more types selected from the group consisting of polyurethane, lithium-substituted Nafion (lithiated Nafion), polyethylene oxide, polypropylene oxide, polysiloxane, polystyrene and polyethylene glycol. Among these, a lithiated Nafion polymer may be preferably used in the present invention.

The lithiated Nafion polymer according to one embodiment of the present invention is a polymer having a form of comprising lithium ions in Nafion (trade name, Du Pont), a copolymer of a sulfonated tetrafluorothylene-based fluorine polymer, and means a form of comprising $Li^+$ ions instead of protons of the sulfonic acid group in a chemical formula structure such as below.

[Chemical Formula 1]

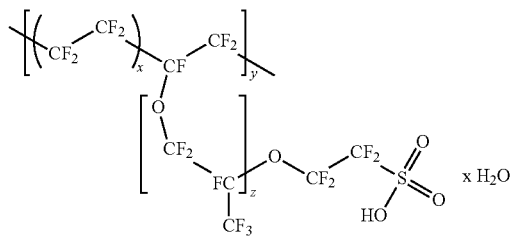

By mixing the carbon nanotube comprising an oxygen functional group and the lithium ion conducting polymer as above, the lithium ion transferring path may be readily secured, and lithium ions are readily transferred therethrough, and problems that have been occurring when using a carbon nanotube alone may be sufficiently resolved.

Moreover, the carbon nanotube comprising an oxygen functional group and the lithium ion conducting polymer used as a coating layer material according to the present invention have hydrophilicity, and since the carbon nanotube of the present invention is capable of introducing an oxygen functional group to the carbon nanotube through an acid treatment process, high wettability is obtained when using a hydrophilic solvent as an electrolyte liquid effectively transferring lithium ions to the lithium metal layer side. Accordingly, lithium ions may be uniformly transferred to the negative electrode. As a result, excellent battery properties are obtained without a battery short-circuit since lithium ions are effectively transferred, and excellent charge and discharge properties are obtained without increasing resistance even with coating layer formation.

In order to sufficiently secure the above-mentioned effects, the coating layer according to the present invention limits a content ratio of the carbon nanotube comprising an oxygen functional group and the lithium ion conducting polymer, and a thickness of the coating layer.

Specifically, the carbon nanotube comprising an oxygen functional group:lithium ion conducting polymer are mixed in a weight ratio of 1:5 to 1:20 and preferably in a weight ratio of 1:10 to 1:15 in the coating layer. When the content of the carbon nanotube comprising an oxygen functional group is low (or the content of the lithium ion conducting polymer is excessive), problems caused by lithium polysulfide may not be sufficiently resolved. On the other hand, when the content of the lithium ion conducting polymer is low (or the content of the carbon nanotube comprising an oxygen functional group is excessive), there is a problem in that penetration of an electrolyte liquid is difficult.

In addition, the coating layer thickness is in a range not increasing internal resistance of a battery while securing the above-described effects, and may be from 100 nm to 20 µm. Preferably, the thickness may be from 200 nm to 10 µm and more preferably from 0.4 µm to 5 µm. When the thickness is less than above-mentioned range, functions as a coating layer may not be performed, and when the thickness is greater than the above-mentioned range on the other hand, stable interfacial properties may be provided, however, an increase in the internal resistance may be caused when manufacturing a battery due to an increase in the initial interfacial resistance.

As described above, the coating layer may be formed on one surface or both surfaces of the separator (5), and, in order to increase a lithium polysulfide adsorption effect, may be formed so as to face the positive electrode (3).

A method for preparing the separator (5) presented in the present invention is not particularly limited in the present invention, and known methods or various methods modifying these methods may be used by those skilled in the art.

As one method, a coating solution comprising the carbon nanotube comprising an oxygen functional group and the lithium ion conducting polymer in a solvent is prepared, and then the coating solution is coated on at least one surface of a porous base and then dried.

As another method, the coating solution is coated on a substrate, and then dried to prepare a coating layer, and the coating layer is transferred or laminated on a porous base to prepare the separator (5).

Any solvent may be used as the solvent as long as it is capable of sufficiently dispersing the carbon nanotube comprising an oxygen functional group and the lithium ion conducting polymer. As one example, the solvent may be a mixed solvent of water and alcohol, or a mixture of one or more organic solvents, and in this case, the alcohol may be a lower alcohol having 1 to 6 carbon atoms, and preferably, methanol, ethanol, propanol, isopropanol and the like. As the organic solvent, polar solvents such as dimethylformamide (DMF) and dimethyl sulfoxide (DMSO), or aprotic solvents such as acetonitrile, ethyl acetate, methyl acetate, fluoroalkane, pentane, 2,2,4-trimethylpentane, decane, cyclohexane, cyclopentane, diisobutylene, 1-pentene, 1-chlorobutane, 1-chloropentane, o-xylene, diisopropyl ether, 2-chloropropane, toluene, 1-chloropropane, chlorobenzene, benzene, diethyl ether, diethyl sulfide, chloroform, dichloromethane, 1,2-dichloroethane, aniline, diethylamine, ether, carbon tetrachloride and tetrahydrofuran (THF) may be used. Preferably, water or a mixed solvent of water and a lower alcohol may be used.

The solvent may be comprised at a level having a concentration capable of facilitating coating, and the specific content varies depending on the coating method and the apparatus. As one example, the coating solution may be prepared by dispersing each of the carbon nanotube comprising an oxygen functional group and the lithium ion conducting polymer into a solution and mixing the solutions, and herein, the coating is performed after adjusting a final coating solution concentration to be in a range of 0.001% by weight to 30% by weight (solid content).

According to one embodiment of the present invention, the carbon nanotube comprising an oxygen functional group may be coated in 5 µg/cm$^2$ to 100 µg/cm$^2$, preferably in 5 µg/cm$^2$ to 40 µg/cm$^2$ and most preferably in 5 µg/cm$^2$ to 20 µg/cm$^2$ with respect to the total area of the separator.

When the coating amount of the carbon nanotube comprising an oxygen functional group is less than the above-mentioned range, a lithium polysulfide adsorption ability may decline, and the coating amount being greater than the above-mentioned range has a disadvantage of decreasing lithium ion conductivity or making electrolyte liquid penetration difficult, and therefore, the coating amount is properly selected within the above-mentioned range.

The substrate may be a separable substrate when using a method such as transferring, that is, a glass substrate or a plastic substrate. Herein, the plastic substrate is not particularly limited in the present invention, and polyarylate, polyethylene terephthalate, polybutylene terephthalate, polysilane, polysiloxane, polysilazane, polyethylene, polycarbosilane, polyacrylate, poly(meth)acrylate, polymethyl acrylate, polymethyl (meth)acrylate, polyethyl acrylate, a cyclic olefin copolymer, polyethyl (meth)acrylate, a cyclic olefin polymer, polypropylene, polyimide, polystyrene, polyvinyl chloride, polyacetal, polyetheretherketone, polyestersulfone, polytetrafluoroethylene, polyvinylidene fluoride, a perfluoroalkyl polymer and the like may be used.

As necessary, ultrasonic waves may be applied to the coating solution prepared for coating in order for uniform dispersion. Dispersibility of the carbon nanotube comprising an oxygen functional group and the lithium ion conducting polymer in the solution may be enhanced when further comprising grinding with ultrasonic waves, and a coating layer having more uniform properties may be prepared.

The coating in this step is not particularly limited, and any known wet coating method may be used. As one example, a method of uniformly dispersing using a doctor blade and the like, methods such as die casting, comma coating, screen printing and vacuum filtration coating, and the like may be comprised.

Then, a drying process for removing the solvent is performed after the coating. The drying process is performed at a temperature and for a period of time enough to sufficiently remove the solvent, and the condition may vary depending on the solvent type and is not particularly limited in the present invention. As one example, the drying may be performed in a vacuum oven at 30° C. to 200° C., and as the drying method, drying methods such as drying by warm air, hot air or low humidity wind, or vacuum drying may be used. The drying time is not particularly limited, however, the drying is normally performed in a range of 30 seconds to 24 hours.

By controlling the concentration of the coating solution according to the present invention, or the number of coating, a coating thickness of the finally coated coating layer may be controlled.

In addition, the coating layer according to the present invention further comprises a lithium salt in order to more smoothly transfer lithium ions.

The lithium salt is not particularly limited in the present invention, and any may be used as long as it is capable of being used in known lithium-sulfur batteries.

Specific examples of the lithium salt may comprise LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, LiSCN, $LiC(CF_3SO_2)_3$, $(CF_3SO_2)_2NLi$, $(FSO_2)_2NLi$, chloroborane lithium, lower aliphatic carboxylic acid lithium, lithium tetraphenylborate, lithium imide and the like, and preferably, lithium bis(trifluoromethane sulfonyl)imide (LiTFSI) represented by $(CF_3SO_2)_2NLi$ or lithium bis (fluorosulfonyl) imide (LiFSI) represented by $(FSO_2)_2NLi$ may be comprised.

Such an ion conducting polymer and a lithium salt are preferably used in 10% by weight or less in 100% by weight of the coating layer composition.

The separator (5) provided with the coating layer as described above may be preferably used in a lithium-sulfur battery as illustrated in FIG. 1.

Such a lithium-sulfur battery resolves problems caused by lithium polysulfide and improves problems of capacity decrease and lifetime decrease in the lithium-sulfur battery, and accordingly, may be used as a lithium-sulfur battery having improved lifetime properties as well as obtaining high capacity and high loading electrodes, and having high stability with no possibility of explosion and fire.

The positive electrode, the negative electrode and the electrolyte liquid provided in the lithium-sulfur battery are described as follows.

The positive electrode has a form of laminating a positive electrode active material on a positive electrode current collector.

The positive electrode current collector is not particularly limited as long as it has high conductivity without comprising chemical changes to a battery, and for example, stainless steel, aluminum, nickel, titanium, baked carbon, aluminum or stainless steel of which surface is treated with carbon, nickel, titanium, silver and the like, or the like may be used.

The positive electrode active material may comprise elemental sulfur ($S_8$), sulfur series compounds or mixtures thereof, and these are composited with a conductor when used since a sulfur material alone does not have electrical conductivity. Specifically, the sulfur series compound may be $Li_2S_n$ (n≥1), an organosulfur compound, a carbon-sulfur polymer ($(C_2S_x)n$: x=2.5 to 50, n≥2) or the like.

The conductor is used for further enhancing conductivity of the electrode active material. Such a conductor is not particularly limited as long as it has conductivity without inducing chemical changes to the corresponding battery, and for example, graphite such as natural graphite or artificial graphite; carbon black such as carbon black, acetylene black, ketjen black, channel black, furnace black, lamp black or thermal black; conductive fibers such as carbon fiber or metal fiber; fluorinated carbon; metal powder such as aluminum and nickel powder; conductive whiskers such as zinc oxide or potassium titanate; conductive metal oxides such as titanium oxide; polyphenylene derivatives, and the like may be used.

The positive electrode may further comprise a binder for binding of the positive electrode active material and the conductor and for binding on the current collector. The binder may comprise a thermoplastic resin or a thermosetting resin. For example, polyethylene, polypropylene, polytetrafluoroethylene (PTFE), polyvinylidene fluoride (PVDF), styrene-butadiene rubber, a tetrafluoroethylene-perfluoro alkylvinyl ether copolymer, a vinylidene fluoride-hexafluoropropylene copolymer, a vinylidene fluoride-chlorotrifluoroethylene copolymer, an ethylene-tetrafluoroethylene copolymer, a polychlorotrifluoroethylene, vinylidene fluoride-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinyl ether-tetrafluoroethylene copolymer, an ethylene-acrylic acid copolymer and the like may be used either alone or as a mixture, however, the binder is not limited thereto, and those capable of being used as a binder in the art may all be used.

Such a positive electrode may be prepared using common methods, and specifically, may be prepared by coating a composition for forming a positive electrode active material layer prepared by mixing a positive electrode active material, a conductor and a binder in an organic solvent or water on a current collector and drying the result, and selectively, compression molding the result on the current collector for enhancing electrode density. Herein, as the organic solvent, those capable of uniformly dispersing the positive electrode active material, the binder and the conductor, and readily evaporating are preferably used. Specifically, acetonitrile, methanol, ethanol, tetrahydrofuran, isopropyl alcohol and the like may be comprised.

The negative electrode may have a form of laminating a negative electrode active material on a negative electrode current collector. The negative electrode current collector may not be comprised when necessary.

Herein, the negative electrode current collector is not particularly limited as long as it has conductivity without inducing chemical changes to a battery, and for example, copper, stainless steel, aluminum, nickel, titanium, baked carbon, copper or stainless steel of which surface is treated with carbon, nickel, titanium, silver and the like, aluminum-cadmium alloys or the like may be used. In addition, as the form, various forms such as films with/without micro-unevenness formed on the surface, sheets, foil, nets, porous bodies, foams and non-woven fabrics may be used.

The lithium metal layer may be lithium metal or a lithium alloy. Herein, the lithium alloy comprises elements capable of alloying with lithium, and the element may be Si, Sn, C, Pt, Ir, Ni, Cu, Ti, Na, K, Rb, Cs, Fr, Be, Mg, Ca, Sr, Sb, Pb, In, Zn, Ba, Ra, Ge, Al, Co or an alloy thereof.

The lithium metal layer may be a sheet or foil, and, in some cases, may have a form of depositing or coating lithium metal or lithium alloy on a current collector using a dry process, or may have a form of depositing or coating particulate metal and alloy using a wet process.

The electrolyte liquid of the lithium secondary battery is a lithium-salt containing electrolyte liquid, and may be an aqueous or non-aqueous electrolyte liquid, is preferably a non-aqueous electrolyte formed with an organic solvent electrolyte liquid and a lithium salt. In addition thereto, an organic solid electrolyte, an inorganic solid electrolyte or the like may be comprised, however, the electrolyte liquid is not limited thereto.

Examples of the non-aqueous organic solvent may comprise aprotic organic solvents such as N-methyl-2-pyrrolidinone, propylene carbonate, ethylene carbonate, butylene carbonate, dimethyl carbonate, diethyl carbonate, ethylmethyl carbonate, gamma-butyrolactone, 1,2-dimethoxyethane, 1,2-diethoxyethane, tetrahydrofuran, 2-methyltetrahydrofuran, dimethyl sulfoxide, 1,3-dioxolane, 4-methyl-1,3-dioxane, diethyl ether, formamide, dimethylformamide, dioxolane, acetonitrile, nitromethane, methyl formate, methyl acetate, phosphoric acid triester, trimethoxymethane, dioxolane derivatives, sulfolane, methylsulfolane, 1,3-dimethyl-2-imidazolidinone, propylene carbonate derivatives, tetrahydrofuran derivatives, ether, methyl propionate or ethyl propionate may be used.

Herein, an ether-based solvent is used as the non-aqueous solvent so as to be similar to an electrode of the present invention, and examples thereof may comprise tetrahydrofuran, ethylene oxide, 1,3-dioxolane, 3,5-dimethyl isoxazole, 2,5-dimethylfuran, furan, 2-methylfuran, 1,4-oxane, 4-methyldioxolane and the like.

The lithium salt is a material favorably dissolved in the non-aqueous electrolyte, and examples thereof may comprise $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $LiSCN$, $LiC(CF_3SO_2)_3$, $(CF_3SO_2)_2NLi$, $(FSO_2)_2NLi$, chloroborane lithium, lower aliphatic carboxylic acid lithium, lithium tetraphenylborate, lithium imide and the like.

The shape of the lithium-sulfur battery (10) described above is not particularly limited, and examples thereof may comprise a jelly-roll type, a stack type, a stack-folding type (comprising stack-Z-folding type) or a lamination-stack type, and may preferably be a stack-folding type.

After preparing an electrode assembly having such positive electrode (3), the separator (5) and the negative electrode (1) as above consecutively laminated, the electrode assembly is placed in a battery case, the electrolyte liquid is injected to the top of the case, and the result is sealed with a cap plate and a gasket and then assembled to manufacture the lithium-sulfur battery (10).

The lithium-sulfur battery (10) may be divided into a cylinder-type, a square-type, a coin-type, a pouch-type and the like, and depending on the size, may be divided into a bulk type and a thin film type. Structures and manufacturing methods of these batteries are widely known in the art, and therefore, detailed descriptions thereon are not comprised.

The lithium-sulfur battery (10) according to the present invention is a high capacity and high loading battery, and may be used as a power supply of devices requiring such properties. Specific examples of the device may comprise power tools operated through receiving electric power by a battery motor; electric vehicles comprising electric vehicles (EV), hybrid electric vehicles (HEV), plug-in hybrid electric vehicles (PHEV) and the like; electric two-wheeled vehicles comprising e-bikes, e-scooters and the like; electric golf carts; systems for power storage and the like, but are not limited thereto.

Hereinafter, examples, comparative example and experimental examples are described in order to illuminate effects of the present invention. However, the following descriptions are just one example regarding contents and effects of the present invention, and the scope of a right and effects of the present invention are not limited thereto.

Example

Example 1

(1) Preparation of Separator

As a porous base, a polyethylene (porosity 50%) film having a thickness of 20 μm was prepared.

After mixing a carboxyl group-introduced carbon nanotube (oxygen atom content in carbon nanotube 4% to 5%) aqueous dispersion (0.002% by weight concentration) and a lithiated Nafion (Du Pont) aqueous dispersion (0.25 mg/mL concentration), ultrasonic waves were applied thereto for 8 hours to prepare a coating solution (carbon nanotube:lithiated Nafion=1:12.5 weight ratio).

The coating solution was poured on the porous base, and the result was vacuum filtered to form a coating layer in 10 μg/cm$^2$ on a surface facing a positive electrode of the porous base. The result was dried for 24 hours at 70° C. to prepare a separator. Herein, the coating layer was measured to have a thickness of approximately 3.1 μm±0.5 μm.

(2) Lithium-Sulfur Battery

Conductive carbon having electrical conductivity and sulfur were mixed in a conductive carbon:sulfur weight ratio (wt %) of 30:70 (21 g:49 g) through a ball mill process to obtain a sulfur-carbon composite. Positive electrode active material slurry was prepared in a composition of, with respect to the total weight of the positive electrode active material slurry, a positive electrode active material comprising the composite (70.0 g), Super-P (20.0 g) as a conductor, polyvinylidene fluoride (10.0 g) as a binder, and N-methyl-2-pyrrolidone (500 g) as a solvent, and the slurry was coated on an aluminum current collector to prepare a positive electrode active site.

With the positive electrode, lithium foil having a thickness of approximately 40 μm was used as a negative electrode, and as an electrolyte liquid, 1 M concentration of $LiN(CF_3SO_2)_2$-dissolved dimethoxyethane:dioxolane (1:1 volume ratio) mixture solution was used, and the separator was used to manufacture a lithium-sulfur battery.

Example 2

A lithium-sulfur battery was manufactured in the same manner as in Example 1 except that a hydroxyl group (—OH)-introduced carbon nanotube was used.

Comparative Example 1

A lithium-sulfur battery was manufactured in the same manner as in Example 1 except that polyethylene without coating the carbon nanotube and the lithium ion conducting polymer was used as the separator.

Comparative Example 2

A lithium-sulfur battery was manufactured in the same manner as in Example 1 except that a carbon nanotube to which an oxygen functional group is not introduced was used.

Experimental Example 1

Each of the lithium-sulfur batteries manufactured in the examples and the comparative examples was operated under a 0.3 C/0.5 C charge/discharge condition. Initial charge and discharge capacity was measured, and a change in the capacity of the lithium-sulfur battery was identified.

FIG. 2 is a graph showing initial charge and discharge capacity of the lithium-sulfur batteries manufactured in Examples 1 and 2, and Comparative Example 1. When referring to FIG. 2, it was seen that the batteries of Examples 1 and 2 having a coating layer according to the present invention had higher initial discharge capacity compared to the battery of Comparative Example 1 not provided with the coating layer.

FIG. 3 is a graph showing lifetime properties of the lithium-sulfur batteries manufactured in Examples 1 and 2, and Comparative Example 1. When referring to FIG. 3, it was seen that the batteries of Examples 1 and 2 had a higher capacity retention rate with respect to initial charge and discharge and exhibited a capacity improving effect, and had excellent lifetime properties compared to the battery of Comparative Example 1 without comprising the carbon nanotube comprising an oxygen functional group and the lithium ion conducting polymer.

FIG. 4 is a graph showing lifetime properties of the lithium-sulfur batteries manufactured in Example 1 and Comparative Example 2. When referring to FIG. 4, it was seen that the battery of Example 1 had a higher capacity retention rate with respect to initial charge and discharge and exhibited a capacity improving effect, and had excellent lifetime properties compared to the battery of Comparative Example 2 using a carbon nanotube without comprising an oxygen functional group.

From such results, it was seen that, by the coating layer provided in the present invention, high initial charge and discharge capacity properties and excellent lifetime properties were able to be secured through adsorbing lithium polysulfide when driving a lithium-sulfur battery.

REFERENCE NUMERAL

10: Lithium Secondary Battery
1: Negative Electrode
3: Positive Electrode
5: Separator

The invention claimed is:

1. A separator for a lithium-sulfur battery comprising:
a porous base; and
a coating layer on at least one surface of the porous base, wherein the coating layer comprises (a) a carbon nanotube comprising an oxygen functional group, and (b) a lithium-substituted copolymer of a sulfonated tetrafluoroethylene-based fluorine polymer (Nafion) as a lithium ion conducting polymer, wherein the carbon nanotube comprising the oxygen functional group:lithium ion conducting polymer are present in a weight ratio of 1:5 to 1:20 in the coating layer, and
wherein the carbon nanotube comprising the oxygen functional group comprises 0.5 wt % to 20 wt % of oxygen atoms with respect to a total weight of the carbon nanotube.

2. The separator for a lithium-sulfur battery of claim 1, wherein the oxygen functional group is one or more selected from the group consisting of a carboxyl group, a hydroxyl group, an ether group, an ester group, an aldehyde group, a carbonyl group and an amide group.

3. The separator for a lithium-sulfur battery of claim 1, wherein the porous base has a thickness of 3 μm to 100 μm, and a pore size of 0.01 μm to 10 μm.

4. The separator for a lithium-sulfur battery of claim 1, wherein the porous base comprises at least one material selected from the group consisting of polyethylene, polypropylene, polyethylene terephthalate, polybutylene terephthalate, polyamide, polyacetal, polycarbonate, polyimide, polyetherketone, polyethersulfone, polyphenylene oxide, polyphenylene sulfide, polyethylene naphthalene, polytetrafluoroethylene, polyvinylidene fluoride, polyvinyl chloride, polyacrylonitrile, cellulose, nylon, polyparaphenylene benzobisoxazole and polyarylate.

5. The separator for a lithium-sulfur battery of claim 1, wherein, in the coating layer, the (a) carbon nanotube comprising the oxygen functional group and the (b) lithium ion conducting polymer are present as a mixture in a weight ratio of 1:10 to 1:15.

6. The separator for a lithium-sulfur battery of claim 1, wherein the coating layer has a thickness of 100 nm to 20 μm.

7. The separator for a lithium-sulfur battery of claim 1, wherein the coating layer has a thickness of 200 nm to 10 μm.

8. The separator for a lithium-sulfur battery of claim 1, wherein the coating layer has a thickness of 0.4 μm to 5 μm.

9. The separator for a lithium-sulfur battery of claim 1, wherein the carbon nanotube comprising the oxygen functional group comprises 2 wt % to 15 wt % of oxygen atoms with respect to the total weight of the carbon nanotube.

10. The separator for a lithium-sulfur battery of claim 1, wherein the carbon nanotube comprising the oxygen functional group is coated in an amount of 5 μg/cm$^2$ to 100 μg/cm$^2$.

11. The separator for a lithium-sulfur battery of claim 1, wherein the carbon nanotube comprising the oxygen functional group is coated in an amount of 5 μg/cm$^2$ to 40 μg/cm$^2$.

12. The separator for a lithium-sulfur battery of claim 1, wherein the carbon nanotube comprising the oxygen functional group is coated in an amount of 5 μg/cm$^2$ to 20 μg/cm$^2$.

13. A lithium-sulfur battery comprising the separator of claim 1.

14. The lithium-sulfur batter of claim 13, wherein the coating ager is present on the porous base on a side of the porous base that faces a positive electrode.

* * * * *